United States Patent
Min et al.

(10) Patent No.: US 10,741,847 B2
(45) Date of Patent: Aug. 11, 2020

(54) METHOD AND APPARATUS FOR SELECTING A REACTANT FOR REMOVING A RESIDUAL LITHIUM COMPOUND FROM A CATHODE MATERIAL

(71) Applicant: SAMSUNG ELECTRONICS CO., LTD., Suwon-si, Gyeonggi-do (KR)

(72) Inventors: Kyoung Min Min, Suwon-si (KR); Kwang Jin Park, Seongnam-si (KR); Eun Seog Cho, Yongin-si (KR); Seung-Woo Seo, Suwon-si (KR); Byung Jin Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 198 days.

(21) Appl. No.: 15/673,570

(22) Filed: Aug. 10, 2017

(65) Prior Publication Data

US 2018/0145332 A1 May 24, 2018

(30) Foreign Application Priority Data

Nov. 24, 2016 (KR) .................. 10-2016-0157667

(51) Int. Cl.

| H01M 4/36 | (2006.01) |
|---|---|
| H01M 4/505 | (2010.01) |
| H01M 4/525 | (2010.01) |
| H01M 4/62 | (2006.01) |
| C01G 53/00 | (2006.01) |
| H01M 4/02 | (2006.01) |
| H01M 4/58 | (2010.01) |

(52) U.S. Cl.
CPC ............ *H01M 4/628* (2013.01); *C01G 53/42* (2013.01); *H01M 4/366* (2013.01); *H01M 4/505* (2013.01); *H01M 4/525* (2013.01); *H01M 4/62* (2013.01); *C01P 2002/50* (2013.01); *C01P 2002/72* (2013.01); *H01M 4/5825* (2013.01); *H01M 2004/028* (2013.01)

(58) Field of Classification Search
CPC ...... H01M 4/366; H01M 4/505; H01M 4/525; H01M 4/5825; H01M 4/62; H01M 4/628; H01M 2004/028; C01P 2002/50; C01P 2002/72; C01G 53/42
See application file for complete search history.

(56) References Cited

U.S. PATENT DOCUMENTS

| 9,343,739 B2 | 5/2016 | Kim et al. |
|---|---|---|
| 2007/0059602 A1 | 3/2007 | Morishiama et al. |
| 2008/0003504 A1 | 1/2008 | Cho et al. |

(Continued)

FOREIGN PATENT DOCUMENTS

| JP | 2014112505 A | 6/2014 |
|---|---|---|
| KR | 100819741 B1 | 3/2008 |

(Continued)

OTHER PUBLICATIONS

Jo et al, "An effective method to reduce residual lithium compounds on NI-rich Li[Ni0.6Co0.2Mn02]O2 active material using phosphoric acid derived Li3PO4 nanolayer", Nano Research, 2014, 1-19.

(Continued)

*Primary Examiner* — Brittany L Raymond
(74) *Attorney, Agent, or Firm* — Cantor Colburn LLP

(57) ABSTRACT

A cathode active material including a lithium nickel composite oxide; and a coating layer including a lithium metal pyrophosphate on the core.

14 Claims, 13 Drawing Sheets

(56) References Cited

U.S. PATENT DOCUMENTS

2012/0253123 A1    10/2012   Cho et al.
2015/0228973 A1     8/2015   Won et al.
2015/0295239 A1    10/2015   Harata et al.

FOREIGN PATENT DOCUMENTS

KR    1020120061374 A    6/2012
KR      101268501 B1    5/2013
KR    1020150093539 A    8/2015

OTHER PUBLICATIONS

Kim et al., "Lithium-Reactive $Co_3(PO_4)_2$ Nanoparticle Coating on High-Capacity $LiNi_{0.8}Co_{0.16}Al_{0.04}O_2$ Cathode Material for Lithium Rechargeable Batteries", Journal of the Electrochemical Society, 154(6), 2007, A495-A499.

FIG. 5

| Reaction Formula | Reactant | | Product | | ΔH [eV] | G [mmol/g] |
|---|---|---|---|---|---|---|
| 1 | $0.67Mn_3(PO_4)_2 + 1.00LiOH$ | → | $0.50Li_2MnP_2O_7 + 1.50MnO + 0.33H_3PO_4$ | = | -1.2321 | 4.2282 |
| 2 | $0.50Mn_3(PO_4)_2 + 1.00LiOH$ | → | $0.50Li_2MnP_2O_7 + 1.50MnO + 0.50H_2O$ | = | -1.2384 | 5.6377 |
| 3 | $0.17Mn_3(PO_4)_2 + 1.00LiOH$ | → | $0.33Li_3PO_4 + 1.50MnO + 0.50H_2O$ | = | -0.8354 | 16.9130 |
| 1 | $1.00Mn_3(PO_4)_2 + 1.00Li_2CO_3$ | → | $1.00Li_2MnP_2O_7 + 1.00MnO + 1.00MnCO_3$ | = | -2.0471 | 2.8188 |
| 2 | $0.33Mn_3(PO_4)_2 + 1.00Li_2CO_3$ | → | $0.67Li_3PO_4 + 1.00MnCO_3$ | = | -1.2413 | 8.4565 |
| 1 | $1.00Mn_3(PO_4)_2 + 1.00Li_2O$ | → | $1.00Li_2MnP_2O_7 + 2.00MnO$ | = | -3.2174 | 2.8190 |
| 2 | $0.33Mn_3(PO_4)_2 + 1.00Li_2O$ | → | $0.67Li_3PO_4 + 1.00MnO$ | = | -2.4115 | 8.4560 |

METHOD AND APPARATUS FOR SELECTING A REACTANT FOR REMOVING A RESIDUAL LITHIUM COMPOUND FROM A CATHODE MATERIAL

CROSS-REFERENCE TO RELATED APPLICATION

This application claims priority to and the benefit of Korean Patent Application No. 10-2016-0157667, filed in the Korean Intellectual Property Office on Nov. 24, 2016, and all the benefits accruing therefrom under 35 U.S.C. § 119, the entire content of which is incorporated herein by reference.

BACKGROUND OF THE INVENTION

(a) Field of the Invention

The present disclosure relates to a method and an apparatus for selecting a reactant for removing a residual lithium compound present on the surface of a cathode active material of a battery.

(b) Description of the Related Art

A residual lithium compound (e.g., $Li_2CO_3$, LiOH, or $Li_2O$) remaining on the surface of a cathode active material of a battery is a primary factors leading to the formation of a gas, and is caused by the residual lithium compound reacting with an electrolyte or other impurities when charging/discharging a battery. The residual lithium compound present on the surface of a cathode active material can cause a deterioration of battery performance when the battery charge/discharge cycle is repeated. In order to remove the residual lithium compound, a method of washing the surface with water or ethanol after synthesizing a cathode active material has been used. However, due to an additional side reaction occurring on the surface of the cathode active material by washing, performance deterioration may occur on the surface of or inside of the cathode active material from the washing. In addition, since a washing process is an additional step of the synthesis of the cathode active material, the washing process adds complexity and cost.

Thus, there remains a need for reducing or eliminating a residual lithium compound on cathode active materials.

SUMMARY OF THE INVENTION

An exemplary embodiment provides a cathode active material including: a coating layer including a lithium metal pyrophosphate produced by a chemical reaction between a residual lithium compound and a metal phosphate for removing the lithium compound.

Another embodiment provides a method for selecting a metal phosphate for removing a residual lithium compound.

Yet another embodiment provides an apparatus for selecting a metal phosphate for removing a residual lithium compound.

According to an embodiment, a cathode active material includes: a core including a lithium nickel composite oxide; and a coating layer including lithium metal pyrophosphate on the core.

In the cathode active material, the lithium nickel composite oxide may be represented by the following Chemical Formula 1:

$$Li_aNi_xM'_yM''_zO_2 \quad \text{Chemical Formula 1}$$

wherein M' is Co, Mn, Ni, Al, Mg, Ti, or a combination thereof; M" is Ca, Mg, Al, Ti, Sr, Fe, Co, Mn, Ni, Cu, Zn, Y, Zr, Nb, B, or a combination thereof; 0<a≤1, 0.7≤x≤1, 0≤y≤0.3, 0≤z≤0.3, and x+y+z=1.

In the cathode active material, the lithium nickel composite oxide may be represented by the following Chemical Formula 2:

$$Li_aNi_xCo_yMn_zO_2 \quad \text{Chemical Formula 2}$$

wherein 0<a≤1, 0.7≤x≤1, 0≤y≤0.3, 0≤z≤0.3, and x+y+z=1.

In the cathode active material, the residual lithium compound may be one of Chemical Formulae 3 to 5:

$$LiOH, \quad \text{Chemical Formula 3}$$

$$Li_2CO_3, \quad \text{Chemical Formula 4}$$

$$Li_2O, \quad \text{Chemical Formula 5}$$

or
a combination thereof.

In the cathode active material, the metal phosphate may be represented by the following Chemical Formula 6:

$$M_xPO_{4y} \quad \text{Chemical Formula 6}$$

wherein M is Al, Co, Mn, Fe, Mg, Zn, V, Ni, Cu, Ca, Y, B, W, Ti, or a combination thereof; 0.25≤x≤0.6, 0.4≤y≤0.75, and x+y=1.

In the cathode active material, the lithium-metal-pyrophosphate may be represented by the following Chemical Formula 7:

$$LiMP_2O_7 \quad \text{Chemical Formula 7}$$

wherein M is Fe, Mn, Ni, Co, V, or a combination thereof.

According to another exemplary embodiment, a method for selecting a reactant for removing a residual lithium compound is provided. The method for selecting a reactant includes: providing a cathode active material of a battery, and then measuring an amount of a residual lithium compound present on a surface of the cathode active material; producing a phase diagram based on a reaction formula of a reaction between a plurality of metal phosphates, the residual lithium compound, and oxygen; determining a reaction energy of the reaction formula and a removal efficiency of the residual lithium compound from the phase diagram; and selecting at least one metal phosphate of the plurality of metal phosphates, based on the reaction energy and the removal efficiency of each of the plurality of metal phosphates; and, selecting at least one metal phosphate among the plurality of metal phosphates to select the reactant.

In the method for selecting a reactant, the coating layer of the cathode active material, coated by the reaction between the lithium compound and the metal phosphate may include a lithium-metal-pyrophosphate (Li-Metal-pyrophosphate) formed by the reaction between the lithium compound and the metal phosphate.

In the method for selecting a reactant, the cathode active material may include a lithium nickel composite oxide, and the lithium nickel composite oxide may be represented by the following Chemical Formula 1:

$$Li_aNi_xM'_yM''_zO_2 \quad \text{Chemical Formula 1}$$

wherein M' is Co, Mn, Ni, Al, Mg, Ti, or a combination thereof; M" is Ca, Mg, Al, Ti, Sr, Fe, Co, Mn, Ni, Cu, Zn, Y, Zr, Nb, B, or a combination thereof; 0<a≤1, 0.7≤x≤1, 0≤y≤0.3, 0≤z≤0.3, and x+y+z=1.

In the method for selecting a reactant, the lithium nickel composite oxide may be represented by the following Chemical Formula 2:

$$Li_aNi_xCo_yMn_zO_2 \qquad \text{Chemical Formula 2}$$

wherein $0<a\leq1$, $0.7\leq x\leq1$, $0\leq y\leq0.3$, $0\leq z\leq0.3$, and $x+y+z=1$.

In the method for selecting a reactant, the residual lithium compound may be one of Chemical Formulae 3 to 5:

$$LiOH, \qquad \text{Chemical Formula 3}$$

$$Li_2CO_3, \qquad \text{Chemical Formula 4}$$

$$Li_2O, \qquad \text{Chemical Formula 5}$$

or a combination thereof.

In the method for selecting a reactant, the metal phosphate may be represented by the following Chemical Formula 6:

$$M_xPO_{4y} \qquad \text{Chemical Formula 6}$$

wherein M is Al, Co, Mn, Fe, Mg, Zn, V, Ni, Cu, Ca, Y, B, W, Ti, or a combination thereof; $0.25\leq x\leq0.6$, $0.4\leq y\leq0.75$, and $x+y=1$.

In the method for selecting a reactant, the lithium-metal-pyrophosphate may be represented by the following Chemical Formula 7:

$$LiMP_2O_7 \qquad \text{Chemical Formula 7}$$

wherein M is Fe, Mn, Ni, Co, V, or a combination thereof.

According to another exemplary embodiment, an apparatus for selecting a reactant for removing a residual lithium compound is provided. The apparatus for selecting a reactant includes a processor and a memory, wherein the processor runs a program stored in the memory, thereby performing providing a cathode active material for a battery; and then measuring an amount of a residual lithium compound present on a surface of the cathode active material; producing a phase diagram based on a reaction formula of a reaction between a plurality of metal phosphates, the residual lithium compound, and oxygen; determining a reaction energy of a reaction formula and a removal efficiency of the residual lithium compound from a phase diagram, and selecting at least one metal phosphate of the plurality of metal phosphates, based on the reaction energy and the removal efficiency of each of the plurality of metal phosphates, to select the reactant.

In the apparatus for selecting a reactant, a coating layer of the cathode active material, coated by a reaction between the residual lithium compound and the metal phosphate, may include a lithium metal pyrophosphate.

In the apparatus for selecting a reactant, the cathode active material may include a lithium nickel composite oxide, and the lithium nickel composite oxide may be represented by the following Chemical Formula 1:

$$Li_aNi_xM'_yM''_zO_2 \qquad \text{Chemical Formula 1}$$

wherein M' is Co, Mn, Ni, Al, Mg, Ti, or a combination thereof; M" is Ca, Mg, Al, Ti, Sr, Fe, Co, Mn, Ni, Cu, Zn, Y, Zr, Nb, B, or a combination thereof; $0<a\leq1$, $0.7\leq x\leq1$, $0\leq y\leq0.3$, $0\leq z\leq0.3$, and $x+y+z=1$.

In the apparatus for selecting a reactant, the lithium nickel composite oxide may be represented by the following Chemical Formula 2:

$$Li_aNi_xCo_yMn_zO_2 \qquad \text{Chemical Formula 2}$$

wherein $0<a\leq1$, $0.7\leq x\leq1$, $0\leq y\leq0.3$, $0\leq z\leq0.3$, and $x+y+z=1$.

In the apparatus for selecting a reactant, the residual lithium compound may be one of Chemical Formulae 3 to 5:

$$LiOH, \qquad \text{Chemical Formula 3}$$

$$Li_2CO_3, \qquad \text{Chemical Formula 4}$$

$$Li_2O, \qquad \text{Chemical Formula 5}$$

or a combination thereof.

In the apparatus for selecting a reactant, the metal phosphate may be represented by the following Chemical Formula 6:

$$M_xPO_{4y} \qquad \text{Chemical Formula 6}$$

wherein M is Al, Co, Mn, Fe, Mg, Zn, V, Ni, Cu, Ca, Y, B, W, Ti, or a combination thereof; $0.25\leq x\leq0.6$, $0.4\leq y\leq0.75$, and $x+y=1$.

In the apparatus for selecting a reactant, the lithium metal pyrophosphate may be represented by the following Chemical Formula 7:

$$LiMP_2O_7 \qquad \text{Chemical Formula 7}$$

wherein M is Fe, Mn, Ni, Co, V, or a combination thereof.

BRIEF DESCRIPTION OF THE DRAWINGS

These and/or other aspects will become apparent and more readily appreciated from the following description of the embodiments, taken in conjunction with the accompanying drawings in which:

FIG. 5 is a table of reaction formulas between manganese phosphate, and the residual lithium compound according to an exemplary embodiment;

DETAILED DESCRIPTION OF THE EMBODIMENTS

Figure 1:
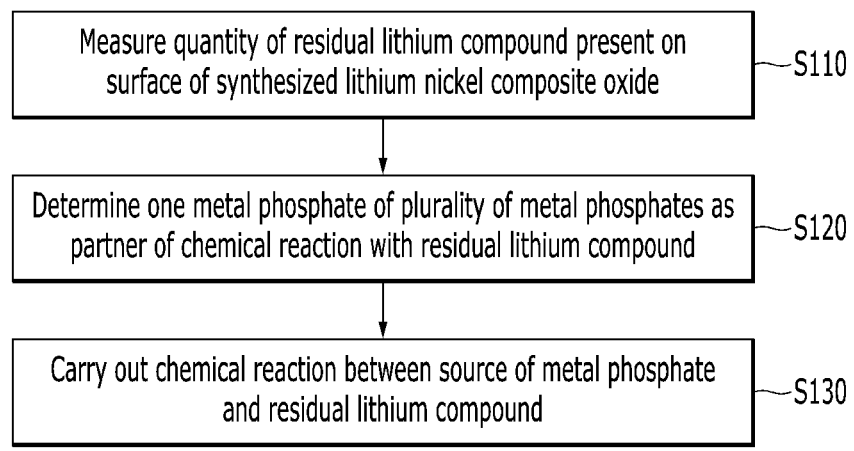
FIG. 1 is a flowchart representing an embodiment of a method of removing a residual lithium compound from a cathode active material.

In the following, exemplary embodiments of the present disclosure will be described in detail, with reference to the accompanying drawings, so that a person with ordinary skill in the art to which the present invention pertains may practice them. However, the present disclosure may be implemented in various different forms, and is not limited to the exemplary embodiments described herein. Further, in order to clearly describe the present disclosure in the drawings, the parts which are not related to the description are omitted, and like parts are given like reference numerals throughout the specification.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. Expressions such as "at least one of," when preceding a list of elements, modify the entire list of elements and do not modify the individual elements of the list.

In addition, unless explicitly described to the contrary, the word "comprise" and variations such as "comprises" or "comprising", will be understood to imply the inclusion of stated elements but not the exclusion of any other elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" is synonymous with "or a combination comprising at least one of the foregoing."

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
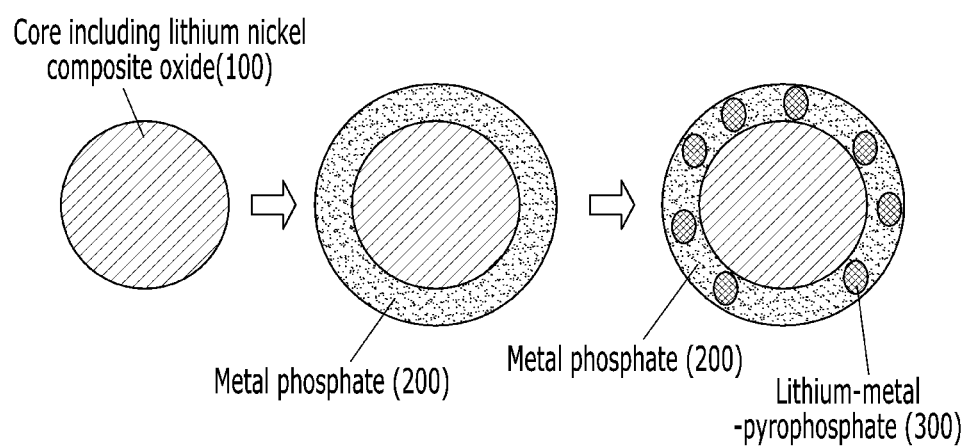
FIG. 2 is a drawing schematically representing an embodiment of a process of removing a residual lithium compound from a cathode active material.

FIG. 1 is a flowchart representing a method of removing a residual lithium compound from a cathode active material for a battery according to an exemplary embodiment, and FIG. 2 is a drawing schematically representing a process of removing the residual lithium compound of a cathode active material according to an exemplary embodiment.

A cathode active material surface coating is used for inhibiting a reaction between a cathode and an electrolyte, or a structure change when charging/discharging a battery. Here, as the surface of the cathode active material is coated, residual lithium may be removed simultaneously. That is, a coating material used in the coating process is directly reacted with a residual lithium compound to remove the residual lithium compound, and a coating effect of the cathode active material may be expected by using the produced material from the reaction. Since a surface washing process using water or ethanol can be omitted to simplify the process, the process is more economical, and also since the produced material from the reaction includes more lithium, a charge rate capability of a battery may be improved.

According to an exemplary embodiment, residual lithium is removed by a chemical reaction between a residual lithium compound present on the surface of a battery cathode active material and a metal phosphate 200, and a product from a chemical reaction between the residual lithium compound and the metal phosphate 200 is used as a coating material of a cathode active material. Referring to FIG. 1, first, a lithium nickel composite oxide is synthesized as a cathode active material of a battery, and an amount of a residual lithium compound remaining on the surface of a core 100 including the synthesized lithium nickel composite oxide is measured (S100). In an embodiment, the chemical formula of the lithium nickel composite oxide is $Li_aNi_xM'_yM''_zO_2$, wherein M' is Co, Mn, Ni, Al, Mg, Ti, or a combination thereof; and M" is Ca, Mg, Al, Ti, Sr, Fe, Co, Mn, Ni, Cu, Zn, Y, Zr, Nb, B, or a combination thereof. The relationship of the constants a, x, y and z representing a mole ratio of each element are $0<a\leq1$, $0.7\leq x\leq1$, $0\leq y\leq0.3$, $0\leq z\leq0.3$, and $x+y+z=1$.

Thereafter, a metal phosphate 200, which can be any of a plurality of metal phosphates, is determined as a partner of a chemical reaction with a residual lithium compound remaining on a cathode surface (S120). As used herein, "a partner of a chemical reaction" means a reactant for removing a residual lithium compound.

Thereafter, a chemical reaction between the sources of metal and phosphorus for synthesizing the determined metal phosphate 200, and the residual lithium compound present on the surface of the lithium nickel composite oxide, is carried out (S130). Here, the chemical reaction between the sources of metal and phosphorus for synthesizing the determined metal phosphate 200 and the residual lithium compound may be carried out at a predetermined temperature (for example, at a high temperature) for a predetermined time under the oxygen atmosphere (for example, the ambient atmosphere). For example, the chemical reaction between the sources of the metal phosphate 200 and the residual lithium compound may be carried out at 720° C. for 5 hours under an oxygen atmosphere. When the chemical reaction between the sources of the metal phosphate 200 and the residual lithium compound is carried out, a lithium-metal-pyrophosphate (Li-metal-pyrophosphate) phase is produced, and the core 100 is coated by a coating layer including the Li-metal-pyrophosphate 300. Here, the quantity of the source of a metal phosphate is determined so that the mass of a coating layer has a predetermined mass ratio relative to the mass of the lithium nickel composite oxide. For example, when the lithium nickel composite oxide is 30 grams (g), a metal phosphate source having a sufficient quantity so that the mass of the coating layer is 1 weight percent (wt %) of the lithium nickel composite oxide (e.g., 0.3 g) participates in the chemical reaction.

Referring to FIG. 2, after a core 100 including the lithium nickel composite oxide is synthesized, for example using a coprecipitation method and the like, a metal phosphate source is introduced, for example injected, to the periphery of the core 100, so that the residual lithium compound present on the surface of the lithium nickel composite oxide and the metal phosphate 200 are reacted with each other, and a coating layer including the lithium-metal-pyrophosphate 300 is formed on the surface of the core 100.

In the following description, and referring to FIGS. 3 to 5, a method of determining a metal phosphate effective for removing the residual lithium compound will be described in further detail.

Figure 3:
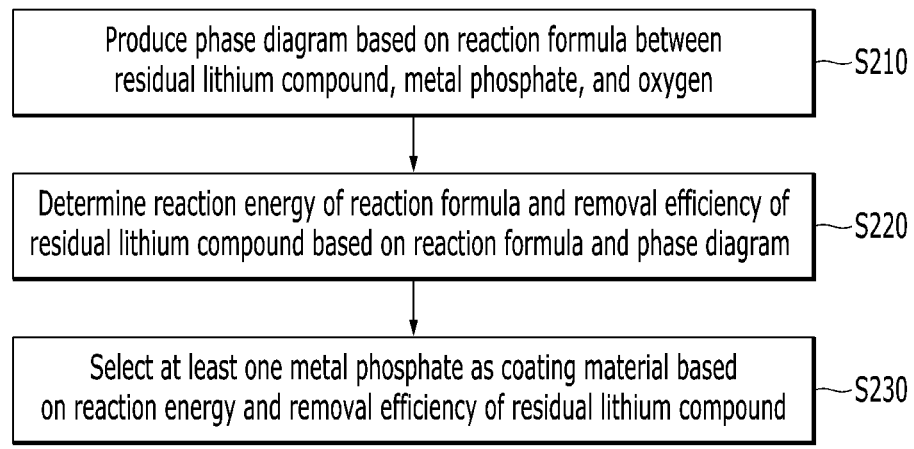
FIG. 3 is a flowchart representing an embodiment of a method of determining the metal phosphate to be used for removing the residual lithium compound.
Figure 4A:
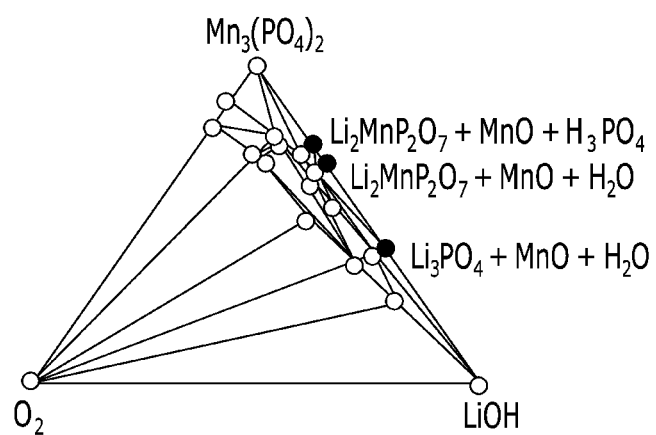
FIGS. 4A to 4C are manganese phosphate-residual lithium compound-oxygen phase diagrams according to an exemplary embodiment.
Figure 4B:
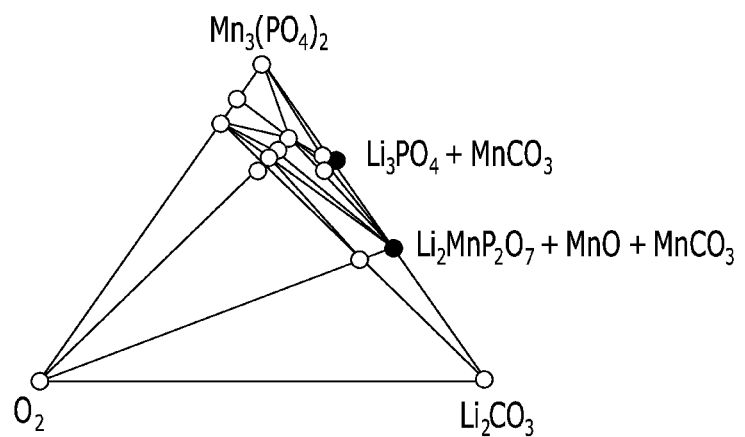
Figure 4C:
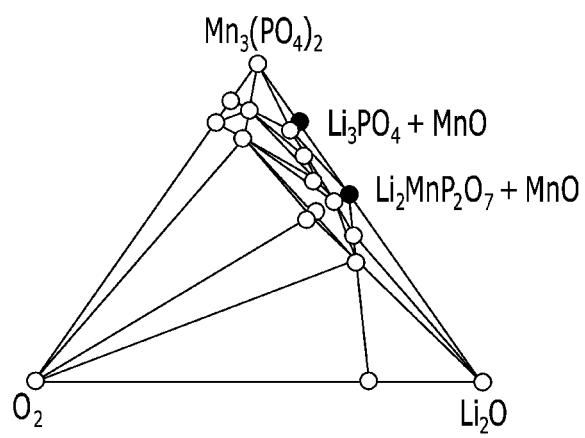

FIG. 3 is a flowchart representing a method of determining the metal phosphate to be used for removing the residual lithium compound according to an exemplary embodiment. FIGS. 4A to 4C are manganese phosphate-residual lithium compound-oxygen phase diagrams for three residual lithium compounds according to an exemplary embodiment. FIG. 5 is a table of reaction formulas for the reaction between manganese phosphate and the residual lithium compound-oxygen according to an exemplary embodiment. Referring to FIG. 3, first, a phase diagram is produced, based on the reaction formula between the residual lithium compound, the metal phosphate, and oxygen (S210). For example, when the number of residual lithium compounds is a total of 3, which are LiOH, $Li_2O$ and $Li_2CO_3$, and the number of metal phosphates is a total of 15, which are $AlPO_4$, $CoPO_4$, $Co_3(PO_4)_2$, $Mn_3(PO_4)_2$, $Fe_3(PO_4)_2$, $Mg_3(PO_4)_2$, $Zn_3(PO_4)_2$, $VPO_4$, $Ni_3(PO_4)_2$, $Cu_3(PO_4)_2$, $Ca_3(PO_4)_2$, $YPO_4$, $BPO_4$, $W(PO_4)_3$, and $TiPO_4$, 45 phase diagrams among reactants may be produced.

Referring to FIGS. 4A to 4C, the phase diagrams between manganese phosphate ($Mn_3(PO_4)_2$) among the metal phosphates, three residual lithium compounds, and oxygen are illustrated. Among the reactants, the oxygen ($O_2$) represents the oxygen in the ambient atmosphere under a chemical reaction environment. In FIGS. 4A to 4C, all points (both the white points and black points) represent products having a stable phase of the chemical reaction between manganese phosphate and the residual lithium compound. A white point represents a reaction formula where $O_2$ participates in the reaction, and a black point represents a reaction formula where manganese phosphate and the residual lithium compound are directly reacted with each other. That is, the black points are present on a straight line connecting the manganese phosphate and the residual lithium compound in the phase diagrams.

Further, FIG. 5 is a table representing the reaction formulae of the black points in the phase diagrams of FIGS. 4A to 4C. Referring to FIG. 5, different products may be produced depending on the molar ratio of manganese phosphate and the residual lithium compound in the case of each reaction. That is, the reaction formula may be varied with the amount of the manganese phosphate added to the reaction. For example, when manganese phosphate and lithium hydroxide are reacted at a molar ratio of 0.5:1, 0.5 mole of lithium manganese pyrophosphate is produced, however, when manganese phosphate and lithium hydroxide are reacted at a molar ratio of 0.17:1, lithium manganese pyrophosphate is not produced, and 0.33 mole of lithium phosphate is produced. When manganese phosphate and lithium hydroxide are reacted at a molar ratio of 0.5:1 to produce lithium manganese pyrophosphate, a reaction energy ($\Delta H$) to remove 1 mole of the residual lithium compound is $-1.2384$ electron volts (eV), and the number of moles (G) of the residual lithium compound to be removed per 1 gram (g) of a coating material is 5.6377 millimoles per gram (mmol/g). Further, when manganese phosphate and lithium hydroxide are reacted at a molar ratio of 0.17:1 to produce lithium phosphate, the reaction energy to remove 1 mole of the residual lithium compound is $-0.8354$ eV, and the moles of the residual lithium compound to be removed per a unit weight of metal phosphate is 16.9130 mmol/g. That is, the case that lithium phosphate is produced by the reaction of manganese phosphate and lithium hydroxide may use a smaller reaction energy, and remove more residual lithium compounds per a unit weight of a metal phosphate, as compared with the case that lithium manganese pyrophosphate is produced.

That is, based on the reaction formula of the reaction and the phase diagram between the residual lithium compound, a plurality of metal phosphates, and oxygen, the reaction energy of the above reaction formula (that is, the energy to remove the residual lithium compound), and the removal efficiency of the residual lithium compound (that is, the moles of the residual lithium compound to be removed per a unit weight) are determined (S220). Further, based on the reaction energy and the removal efficiency of the residual lithium compound corresponding to each metal phosphate, at least one metal phosphate capable of effectively removing the residual lithium compound is selected as a coating material (S230). For example, in the case that there is a limitation on the thickness of a coating layer, the weight of a battery or the like, the metal phosphate capable of removing the residual lithium compound the most per a unit weight, among a plurality of metal phosphates, may be determined as the coating material. Otherwise, in the case that there is a limitation on a reaction energy aspect, a metal phosphate capable of reacting with the residual lithium compound with the highest reaction energy, among a plurality of metal phosphates, may be determined as the coating material.

Figure 6:
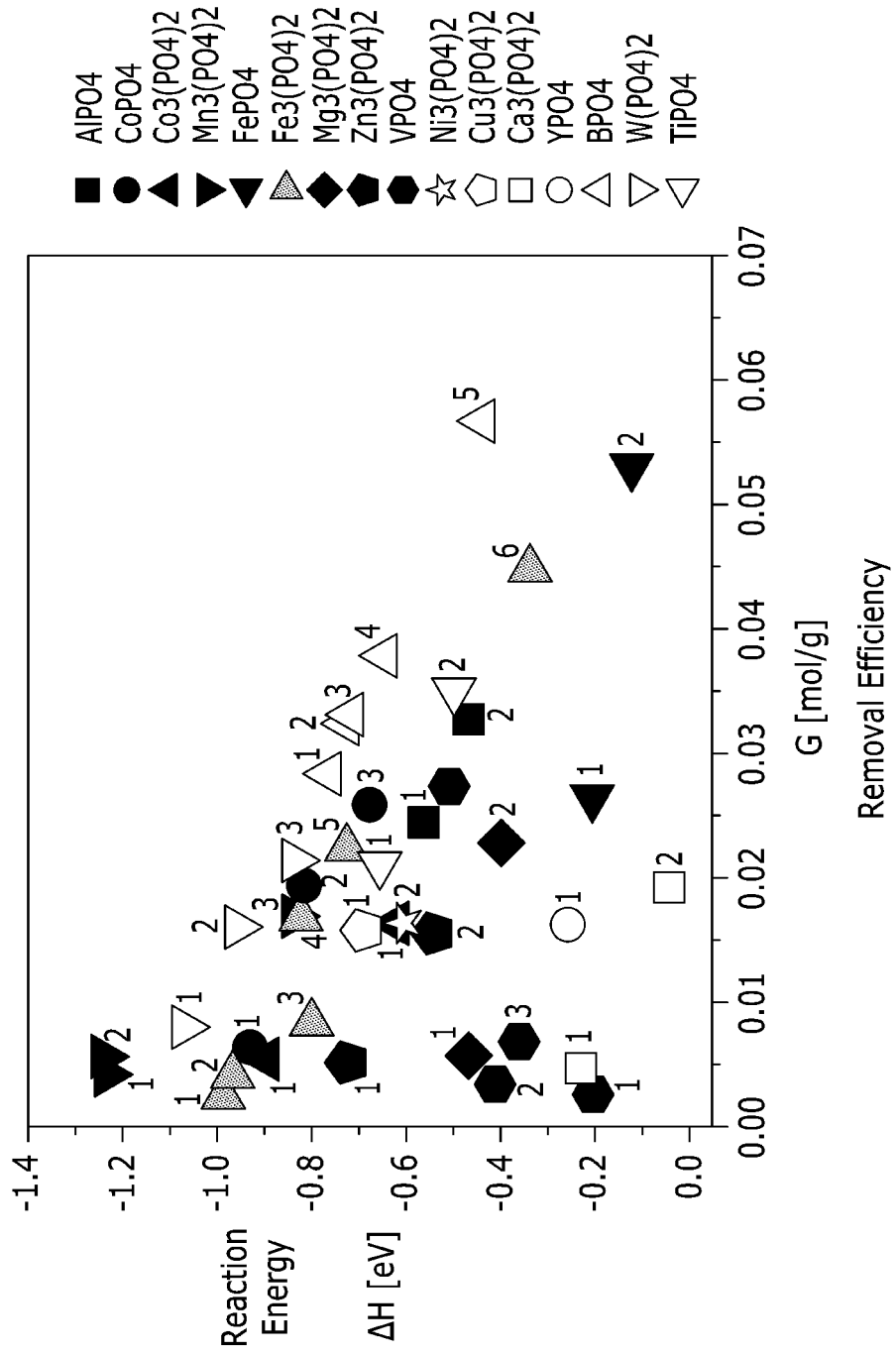
FIG. 6 is a graph of reaction energy ($\Delta H$, electron volts (eV)) versus removal efficiency (G, moles per gram (mol/g)) representing the relationship between reaction energy of a reaction between lithium hydroxide and each metal phosphate, and removal efficiency of a residual lithium compound according to an exemplary embodiment.
Figure 7:
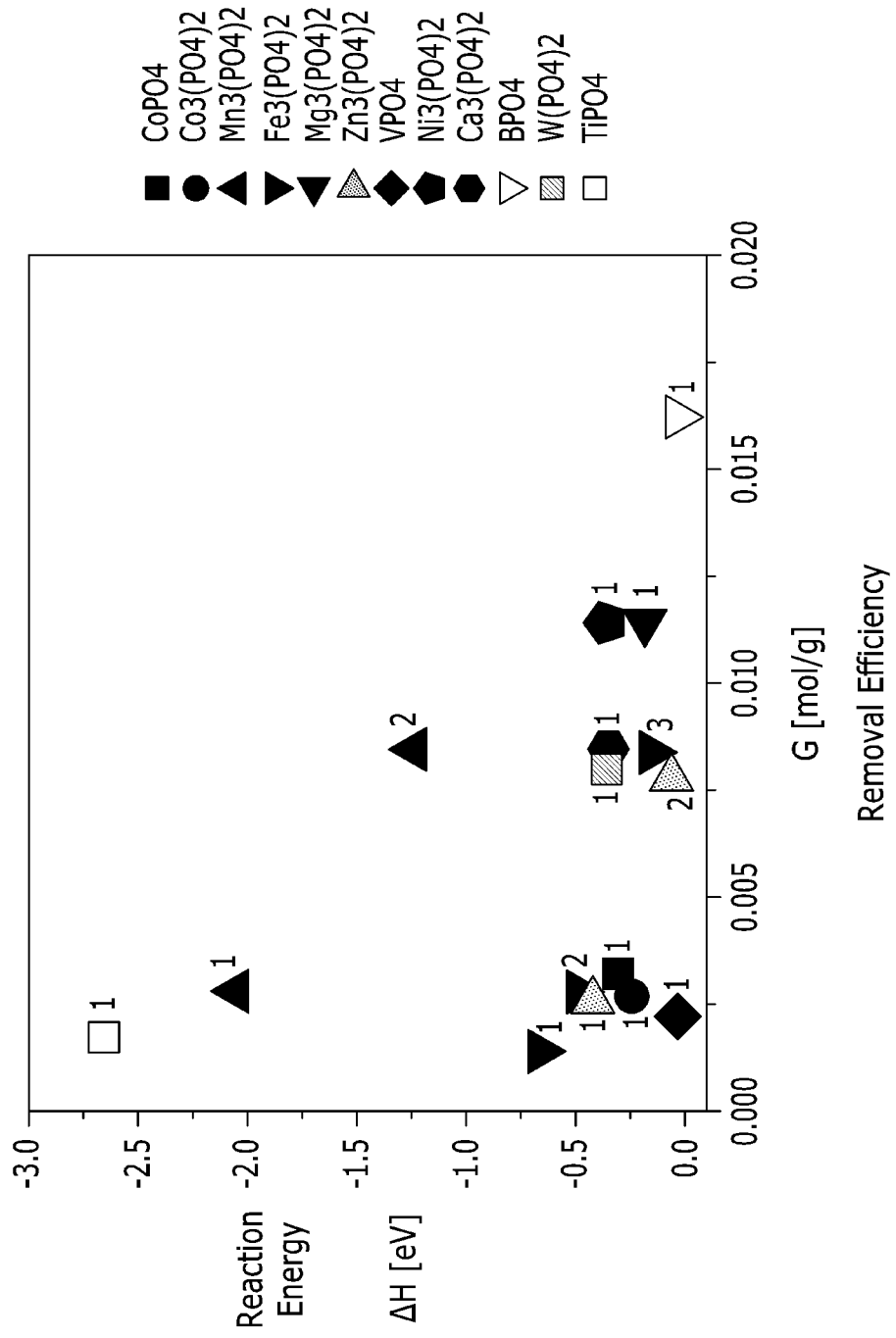
FIG. 7 is a graph of reaction energy ($\Delta H$, (eV)) versus removal efficiency (G, (mol/g)) representing the relationship between reaction energy of a reaction between lithium carbonate and each metal phosphate, and removal efficiency of a residual lithium compound according to an exemplary embodiment.
Figure 8:
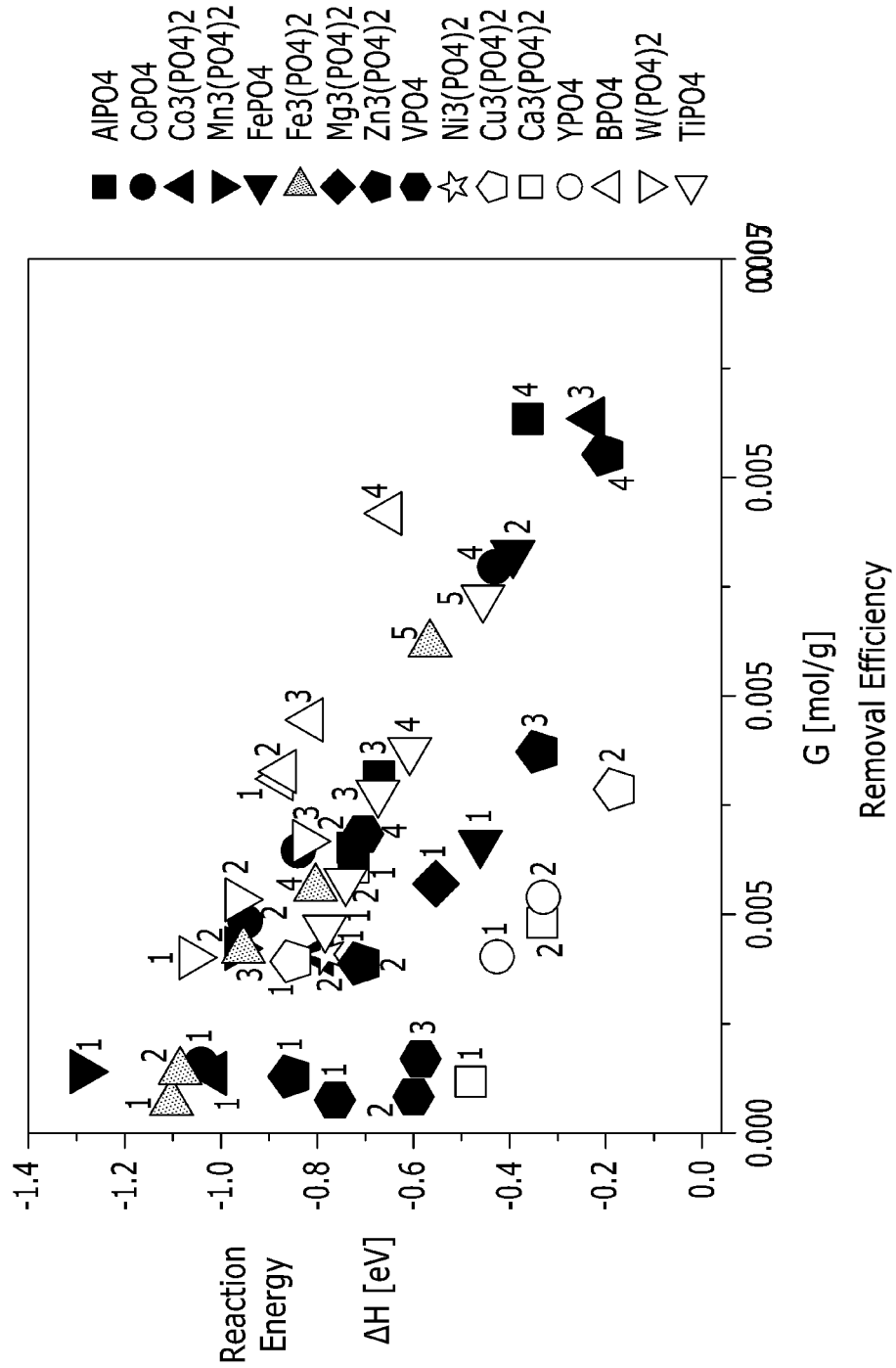
FIG. 8 is a graph of reaction energy ($\Delta H$, (eV)) versus removal efficiency (G, (mol/g)) representing the relationship between reaction energy of a reaction between lithium oxide and each metal phosphate, and removal efficiency of a residual lithium compound according to an exemplary embodiment.

FIGS. 6 to 8 are graphs representing the relationship between reaction energy of a reaction between the residual lithium compound and the metal phosphate and removal efficiency of the residual lithium compound, respectively.

In FIGS. 6 to 8, the x-axis represents moles of the removed residual lithium compound per unit weight of a metal phosphate, and the y-axis represents the reaction energy to remove 1 mole of the residual lithium compound. Referring to FIGS. 6 to 8, $AlPO_4$, $CoPO_4$, $Co_3(PO_4)_2$, $Mn_3(PO_4)_2$, $Fe_3(PO_4)_2$, $Mg_3(PO_4)_2$, $Zn_3(PO_4)_2$, $VPO_4$, $Ni_3(PO_4)_2$, $Cu_3(PO_4)_2$, $Ca_3(PO_4)_2$, $YPO_4$, $BPO_4$, $W(PO_4)_3$, and $TiPO_4$ are the metal phosphates suitable for removing lithium hydroxide and lithium oxide. Referring to FIG. 7, $CoPO_4$, $Co_3(PO_4)_2$, $Mn_3(PO_4)_2$, $Fe_3(PO_4)_2$, $Mg_3(PO_4)_2$, $Zn_3(PO_4)_2$, $VPO_4$, $Ni_3(PO_4)_2$, $Ca_3(PO_4)_2$, $BPO_4$, $W(PO_4)_3$, and $TiPO_4$ are the metal phosphate suitable for removing lithium carbonate.

In the following, the effect of removing the residual lithium compound will be described in further detail, taking the case that the metal phosphate is manganese phosphate $(Mn_3(PO_4)_2)$ as an example.

Table 1 represents the comparison of a total amount of residual lithium (in parts per million, ppm) present on $LiNi_{0.91}Co_{0.06}Mn_{0.03}O_2$, which is a lithium nickel composite oxide, and the total residual lithium when using manganese phosphate as a coating material.

TABLE 1

| Coating Material | $Li_2CO_3$ (wt %) | LiOH (wt %) | Total residual Li (ppm) |
|---|---|---|---|
| Bare (Uncoated) | 1.1303 | 0.6460 | 3993 |
| $Mn_3(PO_4)_2$ | 0.2980 | 0.3040 | 1439 |

Here, a coprecipitation method was used in the synthesis of $LiNi_{0.91}Co_{0.06}Mn_{0.03}O_2$. For synthesizing $LiNi_{0.91}Co_{0.06}Mn_{0.03}O_2$, Ni, Mn, and Co, which are precursors for the nickel-cobalt-manganese (NCM) cathode active material, were added to water from which impurities were removed (DI water), at a ratio of 91:6:3, sufficiently mixed, and then ammonium hydroxide ($NH_4OH$), which is a chelating agent, and a sodium hydroxide solution were added thereto. Thereafter, co-precipitated $(NiMnCo)(OH)_2$ was mixed with lithium hydroxide, and then subjected to calcination at 750° C. under the oxygen atmosphere. Further, $Mn(NO_3)_2 \cdot 4H_2O$ and $(NH_4)_2HPO_4$ were used as sources of metal and phosphorus for the coating material, and the quantity of the sources were determined so that the mass of the coating layer is 1 wt % relative to the mass of the cathode active material. In an exemplary embodiment, when the cathode active material, NCM is 30 g, the coating layer is 0.3 g, and thus, 0.6368 g] of the metal source, $Mn(NO_3)_2 \cdot 4H_2O$, and 0.2233 g of the phosphorus source, $(NH_4)_2HPO_4$, were used. The metal source and the phosphorus source of the coating material are reacted with the residual lithium compound of the cathode active material at a predetermined temperature for a predetermined time under the oxygen atmosphere. For example, the metal source and the phosphorus source of the coating material were reacted with the residual lithium compound at 720° C. for 5 hours under the oxygen atmosphere.

Referring to Table 1, when the cathode active material, $LiNi_{0.91}Co_{0.06}Mn_{0.03}O_2$ is coated with $Mn_3(PO_4)_2$, it is recognized that it is effective for removing two residual lithium compounds (LiOH and $Li_2CO_3$), as compared with the case of not being coated (bare (uncoated)).

Figure 9:
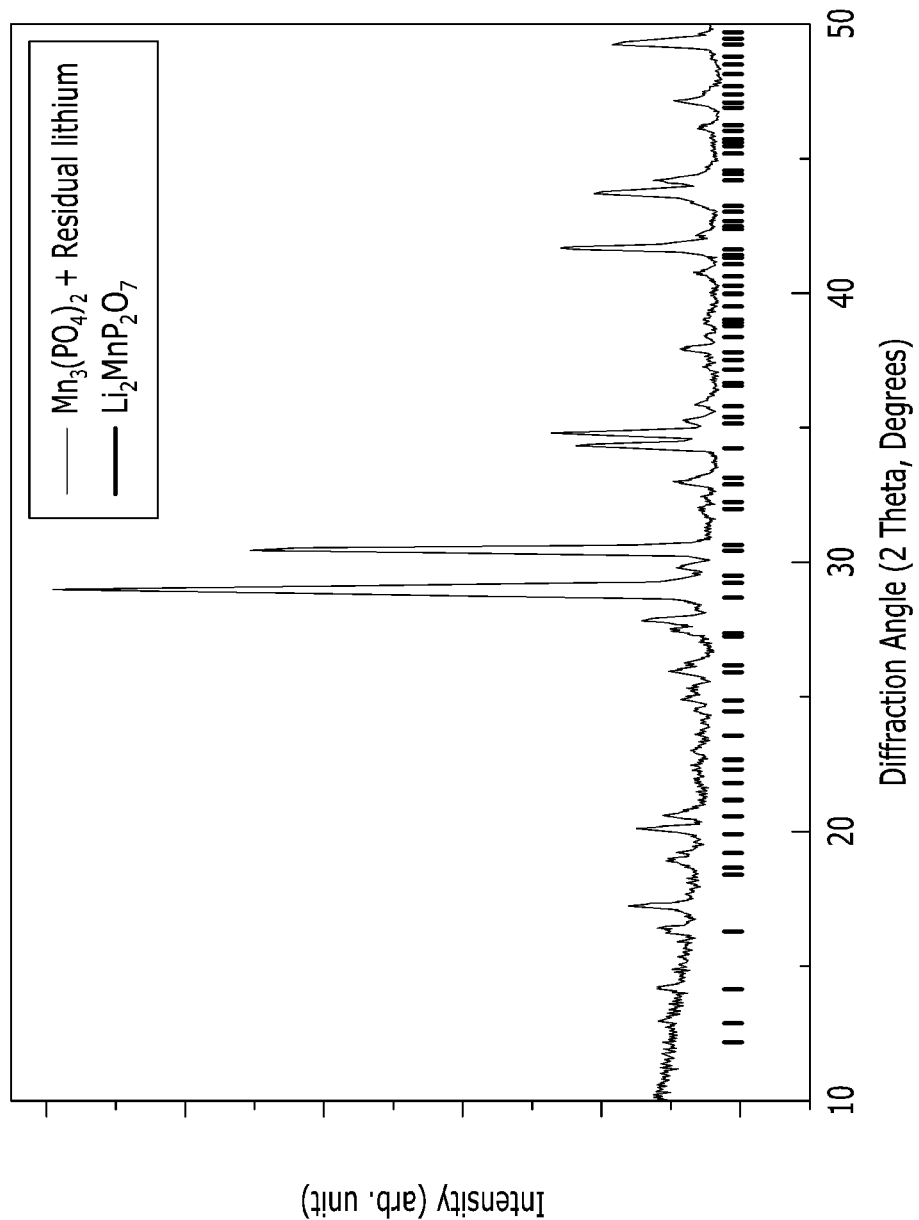
FIG. 9 is a graph of intensity (arbitrary units, arb. units) versus diffraction angle (degrees 2 theta) representing an X-ray diffraction diagram of the product of the chemical reaction and a lithium manganese pyrophosphate spectrum according to an exemplary embodiment.

FIG. 9 is a graph representing an X-ray diffraction diagram of the product of the chemical reaction and a lithium manganese pyrophosphate spectrum according to an exemplary embodiment.

In FIG. 9, the x-axis represents a diffraction angle of the X-ray for the X-ray diffraction (XRD), and the y-axis is the X-ray intensity sensed by the XRD detector. Referring to FIG. 9, it is recognized that the XRD peaks of the product of the reaction between manganese phosphate and the residual lithium compound are consistent with the peaks of the XRD spectrum of lithium manganese pyrophosphate.

In the following, the effect of removing the residual lithium compound will be described in further detail, taking the case that the metal phosphate is iron phosphate $(Fe_3(PO_4)_2)$ as an example.

Table 2 represents the comparison of the total residual lithium of $LiNi_{0.91}Co_{0.06}Mn_{0.03}O_2$ and the total residual lithium when using iron phosphate as the coating material.

TABLE 2

| Coating Material | $Li_2CO_3$ (wt %) | LiOH (wt %) | Total residual Li (ppm) |
|---|---|---|---|
| Bare (Uncoated) | 1.1303 | 0.6460 | 3993 |
| $Fe_3(PO_4)_2$ | 0.2750 | 0.2790 | 1326 |

The synthesis of $LiNi_{0.91}Co_{0.06}Mn_{0.03}O_2$ is identical to the case of manganese phosphate as described above. $Fe(NO_3)_3 \cdot 9H_2O$ and $(NH_4)_2HPO_4$ were used as the sources of metal and phosphorus of the coating material, respectively, and the quantity of each source was determined so that the mass of the coating layer is 1 wt % relative to the mass of the cathode active material, as described above. In an exemplary embodiment, when the content of the cathode active material, NCM is 30 g, the coating layer is 0.3 g, and thus, 1.0171 g of the metal source $Fe(NO_3)_3 \cdot 9H_2O$, and 0.2216 g of the phosphorus source, $(NH_4)_2HPO_4$, were used. The metal source and the phosphorus source of the coating material are reacted with the residual lithium compound of the cathode active material at a predetermined temperature for a predetermined hour under the oxygen atmosphere. For example, the metal source and the phosphorus source of the coating material are reacted with the residual lithium compound at 720° C. for 5 hours under the oxygen atmosphere.

Referring to Table 2, when the cathode active material $LiNi_{0.91}Co_{0.06}Mn_{0.03}O_2$ is coated with $Fe_3(PO_4)_2$, it is recognized that it is effective for removing two residual lithium compounds (LiOH and $Li_2CO_3$), as compared with the case of not being coated (bare (uncoated)).

As described above, the residual lithium remaining on the surface of the cathode active material of a battery may be efficiently removed by using the metal phosphate selected based on the reaction energy and the removal efficiency of the residual lithium.

Figure 10:
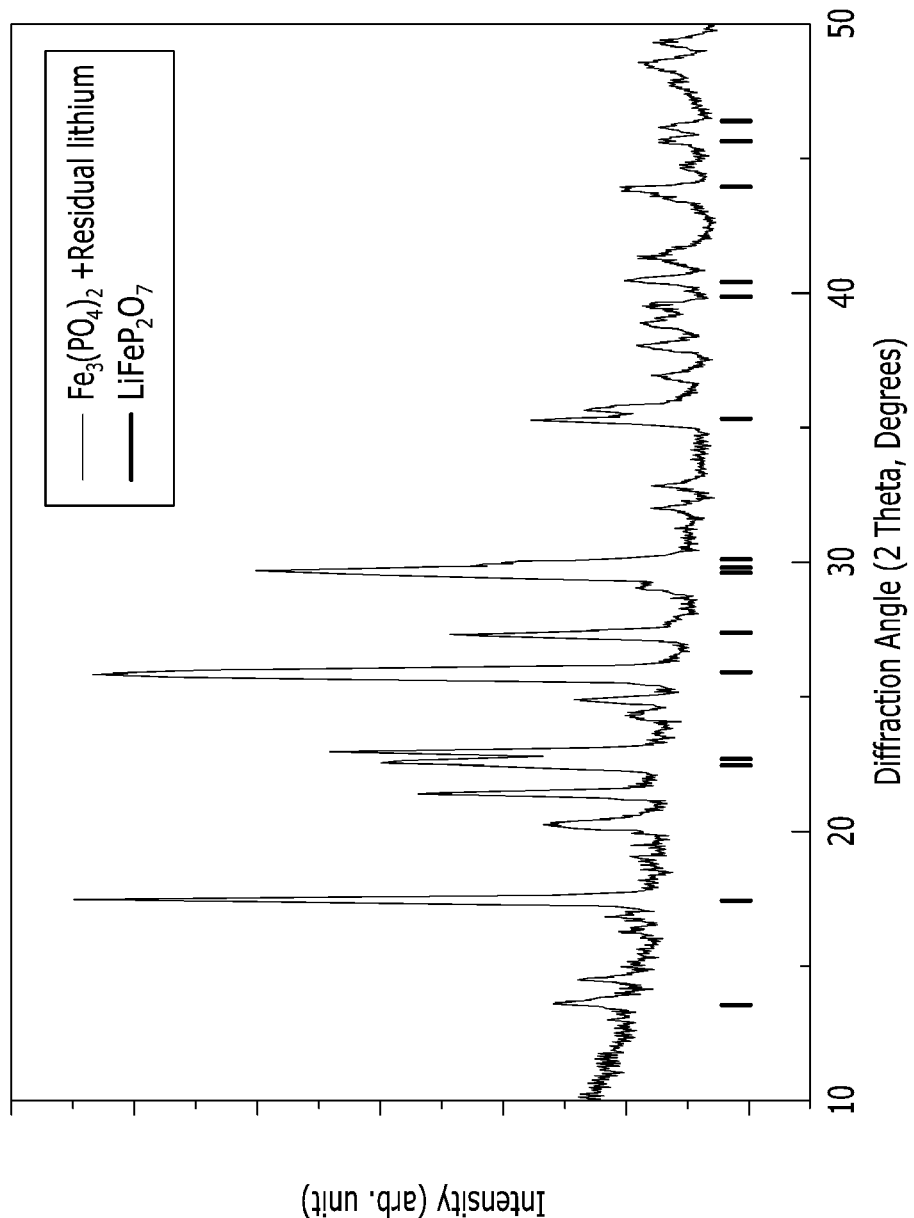
FIG. 10 is a graph of intensity (arbitrary units, arb. units) versus diffraction angle (degrees 2 theta) representing an X-ray diffraction diagram of the product of the chemical reaction and a lithium iron pyrophosphate spectrum according to an exemplary embodiment.

FIG. 10 is a graph representing an X-ray diffraction diagram of the product of the chemical reaction and a lithium iron pyrophosphate spectrum according to an exemplary embodiment.

In FIG. 10, the x-axis represents a diffraction angle of the X-ray for the X-ray diffraction (XRD), and the y-axis is the X-ray intensity sensed by the XRD detector. Referring to FIG. 10, it is recognized that the peaks of XRD for the product of the reaction between iron phosphate and the residual lithium compound are consistent with the XRD peaks of the spectrum of lithium iron pyrophosphate.

Figure 11:
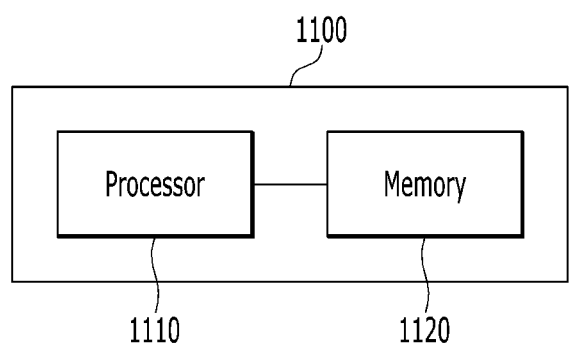
FIG. 11 is a block diagram representing a reactant determination apparatus which determines a metal phosphate to be used in the reaction with the residual lithium compound according to an exemplary embodiment.

FIG. 11 is a block diagram representing an apparatus for selecting a reactant which determines a metal phosphate to be used in the reaction with the residual lithium compound according to an exemplary embodiment.

Referring to FIG. 11, a reactant determination apparatus 1100 according to an exemplary embodiment includes a processor 1100 and a memory 1120.

The memory 1120 may be connected to the processor 1110 to save various information for running the processor 1100 or at least one program run by the processor 1110. The processor 1110 may implement the function, the process, or the method suggested in the exemplary embodiments of the present description. That is, the operation of the reactant determination apparatus 1100 according to an exemplary embodiment may be implemented by the processor 1110.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for selecting a reactant for removing a residual lithium compound, the method comprising:
   providing a cathode active material of a battery, and then measuring an amount of a residual lithium compound present on a surface of the cathode active material;
   determining a phase of products based on a reaction formula of a reaction between a plurality of metal phosphates and the residual lithium compound, wherein the products include a product having a stable phase in the reaction;
   determining a reaction energy of the reaction formula and a removal efficiency of the residual lithium compound from the reaction formula and the phase of the products; and
   selecting at least one metal phosphate of the plurality of metal phosphates based on a desired property of the battery, and based on the reaction energy and the removal efficiency of each of the plurality of metal phosphates to select the reactant.

2. The method of claim 1, further comprising:
   contacting the residual lithium compound and the at least one metal phosphate to form a coating layer on the surface of the cathode active material, wherein the coating layer comprises a lithium metal pyrophosphate, which is a reaction product of the residual lithium compound and the at least one metal phosphate.

3. The method of claim 2, wherein the lithium-metal-pyrophosphate is represented by the following Chemical Formula 7:

$$LiMP_2O_7 \quad \text{Chemical Formula 7}$$

wherein, M is Fe, Mn, Ni, Co, V, or a combination thereof.

4. The method of claim 1, wherein the cathode active material comprises a lithium nickel composite oxide, and wherein the lithium nickel composite oxide is represented by the following Chemical Formula 1:

$$Li_aNi_xM'_yM''_zO_2 \quad \text{Chemical Formula 1}$$

wherein
M' is Co, Mn, Ni, Al, Mg, Ti, or a combination thereof,
M'' is Ca, Mg, Al, Ti, Sr, Fe, Co, Mn, Ni, Cu, Zn, Y, Zr, Nb, B, or a combination thereof,
$0<a\leq1$, $0.7\leq x\leq1$, $0\leq y\leq0.3$, $0\leq z\leq0.3$, and $x+y+z=1$.

5. The method of claim 4, wherein the lithium nickel composite oxide is represented by the following Chemical Formula 2:

$$Li_aNi_xCo_yMn_zO_2 \quad \text{Chemical Formula 2}$$

wherein $0<a\leq1$, $0.7\leq x\leq1$, $0\leq y\leq0.3$, $0\leq z\leq0.3$, and $x+y+z=1$.

6. The method of claim 1, wherein the residual lithium compound is one of Chemical Formulae 3 to 5:

$$LiOH, \quad \text{Chemical Formula 3}$$

$$Li_2CO_3, \quad \text{Chemical Formula 4}$$

$$Li_2O, \text{ or} \quad \text{Chemical Formula 5}$$

a combination thereof.

7. The method of claim 1, wherein the metal phosphate is represented by the following Chemical Formula 6:

$$M_xPO_{4y} \quad \text{Chemical Formula 6}$$

wherein M is Al, Co, Mn, Fe, Mg, Zn, V, Ni, Cu, Ca, Y, B, W, Ti, or a combination thereof, $0.25\leq x\leq0.6$, $0.4\leq y\leq0.75$, and $x+y=1$.

8. An apparatus for selecting a reactant for removing a residual lithium compound from a cathode active material for a battery with a measured amount of a residual lithium compound present on a surface of the cathode active material, the apparatus comprising:
   a processor and a memory,
   wherein the processor runs a program stored in the memory,
   thereby
   determining a phase of products based on a reaction formula of a reaction between a plurality of metal phosphates and the residual lithium compound, wherein the products include a product having a stable phase in the reaction,
   determining a reaction energy from the reaction formula,
   determining a removal efficiency of the residual lithium compound from the reaction formula and the phase of the products, and
   selecting at least one metal phosphate of the plurality of metal phosphates, based on a desired property of the battery, and based on the reaction energy and the removal efficiency of each of the plurality of metal phosphates, to select the reactant.

9. The apparatus of claim 8, wherein:
   a coating layer on the surface of the cathode active material comprises a lithium metal pyrophosphate, which is a product of a reaction between the residual lithium compound and the metal phosphate.

10. The apparatus of claim 9, wherein the lithium-metal-pyrophosphate is represented by the following Chemical Formula 7:

$$LiMP_2O_7 \quad \text{Chemical Formula 7}$$

wherein M is Fe, Mn, Ni, Co, V, or a combination thereof.

11. The apparatus of claim 8, wherein the cathode active material comprises a lithium nickel composite oxide, and the lithium nickel composite oxide is represented by the following Chemical Formula 1:

$$Li_aNixM'_yM''_zO_2 \qquad \text{Chemical Formula 1}$$

wherein

M' is Co, Mn, Ni, Al, Mg, Ti, or a combination thereof,

M" is Ca, Mg, Al, Ti, Sr, Fe, Co, Mn, Ni, Cu, Zn, Y, Zr, Nb, B, or a combination thereof, $0 < a \leq 1$, $0.7 \leq x \leq 1$, $0 \leq y \leq 0.3$, $0 \leq z \leq 0.3$, and $x+y+z=1$.

12. The apparatus of claim 11, wherein the lithium nickel composite oxide is represented by the following Chemical Formula 2:

$$Li_aNi_xCo_yMn_zO_2 \qquad \text{Chemical Formula 2}$$

wherein $0 < a \leq 1$, $0.7 \leq x \leq 1$, $0 \leq y \leq 0.3$, $0 \leq z \leq 0.3$, and $x+y+z=1$.

13. The apparatus of claim 8, wherein the residual lithium compound is one of Chemical Formulae 3 to 5:

$$LiOH, \qquad \text{Chemical Formula 3}$$

$$Li_2CO_3, \qquad \text{Chemical Formula 4}$$

$$Li_2O, \text{ or} \qquad \text{Chemical Formula 5}$$

a combination thereof.

14. The apparatus of claim 8, wherein the metal phosphate is represented by the following Chemical Formula 6:

$$M_xPO_{4y} \qquad \text{Chemical Formula 6}$$

wherein M is Al, Co, Mn, Fe, Mg, Zn, V, Ni, Cu, Ca, Y, B, W, Ti, or a combination thereof; $0.25 \leq x \leq 0.6$, $0.4 \leq y \leq 0.75$, and $x+y=1$.

* * * * *